US011853353B2

(12) United States Patent
Huang et al.

(10) Patent No.: US 11,853,353 B2
(45) Date of Patent: Dec. 26, 2023

(54) MUSIC PUSHING METHOD, APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Yipeng Huang, Beijing (CN); Chaopeng Liu, Beijing (CN); Yan Yu, Beijing (CN); Jia Qu, Beijing (CN); Wei Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/601,068

(22) PCT Filed: Jul. 2, 2021

(86) PCT No.: PCT/CN2021/104349
§ 371 (c)(1),
(2) Date: Oct. 3, 2021

(87) PCT Pub. No.: WO2022/042033
PCT Pub. Date: Mar. 3, 2022

(65) Prior Publication Data
US 2022/0318300 A1 Oct. 6, 2022

(30) Foreign Application Priority Data
Aug. 31, 2020 (CN) .......................... 202010899692.3

(51) Int. Cl.
*G06F 3/0484* (2022.01)
*G06F 16/635* (2019.01)
(Continued)

(52) U.S. Cl.
CPC .......... *G06F 16/637* (2019.01); *G06F 3/0482* (2013.01); *G06F 3/0484* (2013.01); *G06F 16/686* (2019.01)

(58) Field of Classification Search
CPC .... G06F 16/637; G06F 3/0482; G06F 3/0484; G06F 16/686; G06F 16/9536; H04L 67/55
See application file for complete search history.

(56) References Cited

U.S. PATENT DOCUMENTS 10,430,452 B2 * 10/2019 Ross .................... G06F 16/4387
10,474,422 B1 * 11/2019 Venti .................... G06F 3/04886
(Continued)

FOREIGN PATENT DOCUMENTS

| CN | 102187338 A | 9/2011 |
|----|-------------|--------|
| CN | 103023971 A | 4/2013 |

(Continued)

OTHER PUBLICATIONS

JS auto scroll looping, Apr. 9, 2018, retrieved from—https:// stackoverflow.com/questions/49726366/js-auto-scroll-looping, 5 pages (Year: 2018).*

(Continued)

*Primary Examiner* — Yongjia Pan

(57) ABSTRACT

Music pushing method, apparatus, electronic device, and storage medium are provided by the embodiments of the present disclosure, for the method, firstly, a user end displays user information that satisfies a preset association relationship with music currently on a music playing interface in response to an operation acting on the music playing interface. In the present embodiments, upon inputting an operation instruction on target music by a user, information of other users who have taken an associated operation instruction to the target music and have an unrestricted friend relationship with the user is displayed, and by presenting (Continued)

music lists corresponding to other users, the user is guided to acquire music pushing information, and thus, ways for the user to acquire the music pushing information are expanded, and problems that music pushing is single and centralized as well as the pushing depends on a friend relationship are overcome.

16 Claims, 7 Drawing Sheets

(51) Int. Cl.
  *G06F 16/68* (2019.01)
  *G06F 3/0482* (2013.01)
  *G06F 16/9536* (2019.01)

(56) References Cited

U.S. PATENT DOCUMENTS

| | | | | |
|---|---|---|---|---|
| 10,506,276 | B2* | 12/2019 | Tseng | H04N 21/4312 |
| 11,095,946 | B2* | 8/2021 | Domm | H04N 21/4788 |
| 11,126,344 | B2* | 9/2021 | Okafor | H04L 51/52 |
| 2010/0100820 | A1 | 4/2010 | Bryant et al. | |
| 2010/0324704 | A1* | 12/2010 | Murphy | G06Q 10/10 |
| | | | | 705/306 |
| 2011/0244878 | A1* | 10/2011 | Kochetkov | H04W 4/21 |
| | | | | 455/422.1 |
| 2013/0073979 | A1* | 3/2013 | Shepherd | G06Q 50/01 |
| | | | | 715/744 |
| 2013/0073983 | A1* | 3/2013 | Rasmussen | G06Q 30/02 |
| | | | | 715/753 |
| 2014/0025688 | A1* | 1/2014 | Andler | G06Q 50/01 |
| | | | | 707/748 |
| 2015/0058751 | A1* | 2/2015 | Tseng | G06Q 30/0251 |
| | | | | 715/753 |
| 2015/0127727 | A1* | 5/2015 | Tseng | H04L 67/53 |
| | | | | 709/204 |
| 2015/0286714 | A1* | 10/2015 | Talbott | G06Q 30/0269 |
| | | | | 707/706 |
| 2017/0054675 | A1* | 2/2017 | Tseng | G06F 3/04886 |
| 2017/0180288 | A1* | 6/2017 | Barbour | H04L 51/10 |
| 2018/0069939 | A1* | 3/2018 | Matas | G06F 3/04817 |
| 2021/0034664 | A1* | 2/2021 | Detroja | G06F 16/686 |
| 2022/0057984 | A1* | 2/2022 | Yang | H04N 21/4782 |

FOREIGN PATENT DOCUMENTS

| | | | |
|---|---|---|---|
| CN | 104123315 A | 10/2014 | |
| CN | 105072146 A | 11/2015 | |
| CN | 106506774 A | 3/2017 | |
| CN | 107368552 A | 11/2017 | |
| CN | 107633430 A | 1/2018 | |
| CN | 107967357 A | 4/2018 | |
| CN | 110266879 A | 9/2019 | |
| CN | 110968726 A | 4/2020 | |
| CN | 112035758 A | 12/2020 | |
| EP | 2444929 B1 * | 8/2016 | G06Q 30/02 |

OTHER PUBLICATIONS

Find friends active (logged in) on Facebook app right now, Oct. 18, 2014, retrieved from—https://stackoverflow.com/questions/26436825/find-friends-active-logged-in-on-facebook-app-right-now, 2 pages (Year: 2014).*
Maria Hakansson, Mattias Rost, Mattias Jacobsson, Lars Erik Holmquist, Facilitating Mobile Music Sharing and Social Interaction with Push!Music, Jan. 3-6, 2007, 10 pages (Year: 2007).*
Button clicked on scroll, just one click every few seconds, Mar. 6, 2017, retrieved from—https://stackoverflow.com/questions/42624512/button-clicked-on-scroll-just-one-click-every-few-seconds, 2 pages (Year: 2017).*
Powershell to filter user latest last login and last login greater than X number of days, Apr. 21, 2017, retrieved from—https://stackoverflow.com/questions/43546898/powershell-to-filter-user-latest-last-login-and-last-login-greater-than-x-number, 3 pages (Year: 2017).*
How to exclude non-active users from queryset in django, May 19, 2014, retrieved from—https://stackoverflow.com/questions/23737189/how-to-exclude-non-active-users-from-queryset-in-django, 4 pages (Year: 2014).*
Get a list of users with or without photos in Office 365, Mar. 19, 2018, retrieved from—https://community.spiceworks.com/topic/2121634-get-a-list-of-users-with-or-without-photos-in-office-365, 3 pages (Year: 2018).*
International Patent Application No. PCT/CN2021/104349, International Search Report dated Sep. 30, 2021.
CNOA dated Jun. 2, 2021 for CNCNP202000547.
CNOA dated Sep. 14, 2021 for CNCNP202000547.

* cited by examiner

MUSIC PUSHING METHOD, APPARATUS, ELECTRONIC DEVICE AND STORAGE MEDIUM

CROSS-REFERENCE TO RELATED APPLICATIONS

The present disclosure is a national stage of International Application No. PCT/CN2021/104349, filed on Jul. 2, 2021, which claims priority to Chinese Patent Application No. 202010899692.3, filed on Aug. 31, 2020, both of the above applications are incorporated herein by reference in their entireties.

TECHNICAL FIELD

Embodiments of the present disclosure relate to the technical field of computer and network communication, and in particular, to a music pushing method, apparatus, electronic device, and storage medium.

BACKGROUND

With the popularization of the Internet and the improvement of people's living standard, using a Mobile Phone's APP or program software on an intelligent terminal to acquire audio, video, text, picture, etc., has become a daily entertainment activity for most users.

At present, most users acquire music information by proactively searching music of interest to them, for example, by means of clicking on a recommended playlist, a popular radio station, and a song chart of music playing software. A back-end server corresponding to the music playing software pushes a music song, etc., according to historical music playing data of a user. Some kinds of music software pushes music by means of mutual pushing of music between users and their friends.

However, current music pushing manners depend too much on proactive behavior of a user; searching, or analyzing historical data, or pushing and sharing among friends, must be based on user-centric proactive discovery behavior; for a new user or a user who is less proactive, it is unable to quickly push music of interest to the user, or for an old user, music information being pushed has excessively high repetitiveness, and it is unable to accurately broaden the pushing, resulting in that the pushing manners are too conservative and single, or excessive error correction intervention by the user is needed, and thus, the user experience is affected, and the mutual pushing among friends is too centralized, in the case of a user having fewer friends, resulting in that discovery rates of music among different users are low, or in other words music pushing means depend too much on a relationship between a user and other users.

SUMMARY

Embodiments of the present disclosure provide a music pushing method, apparatus, electronic device, and storage medium, to overcome technical problems in prior art that the music pushing manners are too single and centralized, depend too much on user proactive behavior and relationships among users, and unable to effectively expand ways for users to acquire music pushing information.

In a first aspect, an embodiment of the present disclosure provides a music pushing method, including:
displaying first pushing information in response to an operation on a music playing interface;
where the first pushing information includes user information, and the user information satisfies a preset association relationship with music currently on the music playing interface.

In a second aspect, an embodiment of the present disclosure provides a music pushing apparatus, including:
an acquiring module, configured to acquire an operation on a music playing interface;
a processing module, configured to display first pushing information in response to the operation, where the first pushing information includes user information, and the user information satisfies a preset association relationship with music currently on the music playing interface.

In a third aspect, an embodiment of the present disclosure provides an electronic device, including:
at least one processor and a memory;
where the memory stores computer executable instructions;
the at least one processor executes the computer executable instructions stored in the memory, causing the at least one processor to perform the music pushing method in the above first aspect and various possible designs of the first aspect.

In a fourth aspect, an embodiment of the present disclosure provides a computer readable storage medium, the computer readable storage medium stores computer executable instructions, when a processor executes the computer executable instructions, the music pushing method in the above first aspect and various possible designs of the first aspect is implemented.

In a fifth aspect, an embodiment of the present disclosure provides a computer program product, the computer program product includes: a computer program, when a processor executes the computer program, the music pushing method in the above first aspect and various possible designs of the first aspect is implemented.

In a sixth aspect, an embodiment of the present disclosure provides a computer program, when a processor executes the computer program, the music pushing method in the above first aspect and various possible designs of the first aspect is implemented.

Music pushing method, apparatus, electronic device, and storage medium are provided by the present embodiments, for the method, firstly, a user end displays user information that satisfies a preset association relationship with music currently on a music playing interface in response to an operation acting on the music playing interface. In the present embodiments, upon inputting an operation instruction on target music by a user, information of other users who have taken an associated operation instruction to the target music and have an unrestricted friend relationship with the user is displayed, and by presenting music lists corresponding to other users, the user is guided to acquire music pushing information, and thus, ways for the user to acquire the music pushing information are expanded, and problems that music pushing is single and centralized as well as the pushing depends on a friend relationship are overcome.

BRIEF DESCRIPTION OF DRAWINGS

In order to more clearly illustrate technical solutions in embodiments of the present disclosure or the prior art, drawings that need to be used in description of the embodiments or the prior art will be briefly introduced below, it is obvious that the drawings in the following description are some embodiments of the present disclosure, and for those of ordinary skill in the art, other drawings may also be acquired according to these drawings without paying any creative efforts.

DESCRIPTION OF EMBODIMENTS

In order to make objectives, technical solutions and advantages of embodiments of the present disclosure clearer, the technical solutions in the embodiments of the present disclosure will be described clearly and completely in conjunction with the drawings in the embodiments of the present disclosure. Obviously, the described embodiments are a part of the embodiments of the present disclosure, not all of the embodiments of the present disclosure. Based on the embodiments in the present disclosure, all other embodiments acquired by those of ordinary skill in the art without paying any creative efforts, including but are not limited to a combination of multiple embodiments, fall within the protection scope of the present disclosure.

The terms "first", "second", "third", "fourth", and the like (if any) in the description, the claims and the above drawings of the present disclosure are used to distinguish between similar objects, and not necessarily to describe a specific sequence or order. It should be understood that data used in this way may be interchanged under appropriate circumstances, so that the embodiments of the present disclosure described herein, for example, may be implemented in a sequence other than those illustrated or described herein. In addition, the terms "include" and "have" as well as any variations thereof are intended to cover non-exclusive inclusions. For example, a process, method, system, product, or device that includes a series of steps or units does not necessarily limited to those clearly listed steps or units, but may include other steps or units that are not clearly listed or are inherent to the process, method, product, or device.

Figure 1:
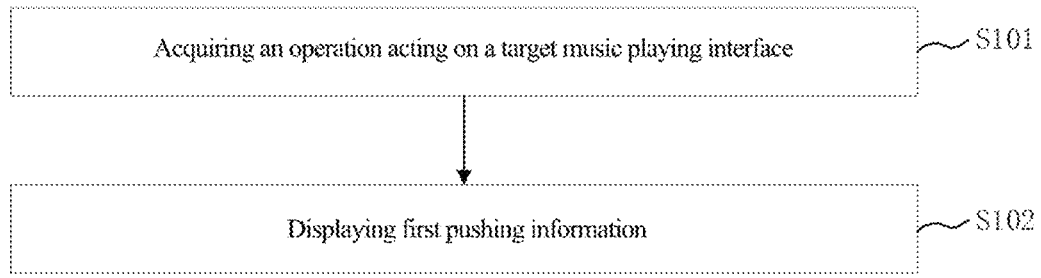
FIG. 1 is a first schematic flow diagram of a music pushing method provided by an embodiment of the present disclosure.

Referring to FIG. 1, FIG. 1 is a first schematic flow diagram of a music pushing method provided by an embodiment of the present disclosure. The method of the present embodiment is applied to a terminal device and/or a server of a user end, and the music pushing method includes:

S101: acquiring an operation acting on a target music playing interface.

In the present embodiment, target music includes: a singing song, an accompaniment, a musical composition, a symphony, etc.

In the present step, a user inputs an operation instruction on the terminal device of the user end, for example, clicks on a "collection" button, then the user end will acquire corresponding music information according to music being played in current software, for example, in the present embodiment, the music information of the music being played in the current interface is information, for example, a song title, a singer, a composer, a lyricist, an belonging album, a release time, etc.

Figure 2A:
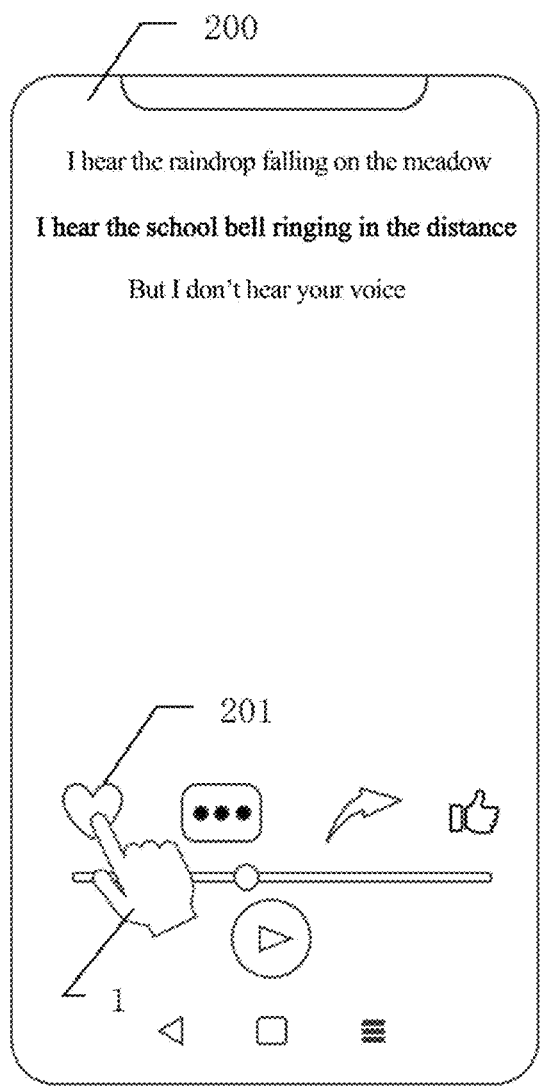
FIGS. 2a-2f are schematic diagrams of scenes in which a user operates a music playing interface provided by embodiments of the present disclosure.

Referring to FIGS. 2a-2f, FIGS. 2a-2f are schematic diagrams of scenes in which a user operates a music playing interface provided by embodiments of the present disclosure. As shown in FIG. 2a, a music playing interface of a music playing APP is displayed on a screen of a full-screen mobile phone 200, in this interface, the following are included: lyrics of the music being played, a playing progress bar, a playing/pausing control button, a collecting control 201, a commenting control, a sharing control, a liking control, etc.

In a possible embodiment, the user's hand 1 clicks on the collecting control 201, then the user end gathers information related to the music currently on the music playing interface, to form a data packet, that is, a first pushing request, which is sent to a server via the Internet.

Then, screening out user information that satisfies a preset association relationship from a user database according to the music information.

In the present step, the preset association relationship is that a same and/or related operation is taken to target music, for example, the target music is added to a "red heart playlist", or as long as the same target music is added to any playlist corresponding to a user account.

In the present embodiment, the preset association relationship is that the music being played in the music playing interface is added to at least one of a collection playlist, a self-built playlist, and a red heart playlist. It should be noted that the red heart playlist represents a music playlist that a user particularly likes or pays particular attention to.

It should also be noted that in the present step, the user information includes at least one of friend user information and stranger user information. That is, the music pushing method provided by the present disclosure screens out a user who satisfies the preset association relationship from all user lists, rather than screens out a user just in a friend list so as to simplify retrieval for increasing speed as in the prior art. The embodiment of the present disclosure may screen in a friend list, in a stranger list, or in both lists simultaneously. Those skilled in the art may select a screening range according to actual conditions.

In a possible design, the screening out the user information that satisfies the preset association relationship from the user database according to the music information includes:
screening out a preset number of user information that satisfies the preset association relationship from the user database according to the music information;
accordingly, the first pushing information includes the preset number of the user information.

Specifically, for example, the preset number is 3, comparison and search is carried out one by one in the user database according to a preset screening model or a preset retrieve algorithm, when 3 users who have collected the target music are screened out, the screening is stopped, and user information of these three users may be stored as temporary data. The user end takes the user information of these three users as the first pushing information for displaying.

In another possible design, the screening out the user information that satisfies the preset association relationship from the user database according to the music information includes:

screening out all user information that satisfies the preset association relationship from the user database according to the music information.

Specifically, the user database is retrieved and traversed once to acquire all users who satisfy the preset association relationship, for example, after all users who have collected the target music are screened out, user information of all screened out users is taken as the first pushing information.

In yet another possible design, the screening out the user information that satisfies the preset association relationship from the user database according to the music information includes:

firstly, screening out a preset number of user information that satisfies the preset association relationship from the user database according to the music information, and taking the preset number of user information as the first pushing information, and then, continuously screening out user information corresponding to all users who satisfy the preset association relationship from the entire user database by utilizing the retrieve algorithm, and taking all user information that has been screened out as a second pushing information.

Further, after the screening is completed, if the number of the user information is less than the preset number, the first pushing information is used for indicating that the user end does not display additional content for the operation on the music interface.

Specifically, the traversal of the user database has been completed, but the number of users being screened out does not meet the preset number, for example, 3, then at this time, the user end does not need to display the first pushing control since sufficient users who satisfy the condition are not searched.

In the present step, the first pushing information includes user information, and the user information includes a user profile picture.

Specifically, the first pushing information may be a user profile picture and/or a user name. It is understood that in the present embodiment, the first pushing information may further include other contents, for example, a user's homepage website, an album that the target music belongs to, other information related to the target music, etc., the user end may select a content that needs to be displayed according to a layout of the interface, for example, for a mobile phone, only user's profile picture is displayed, while for a user terminal with a larger screen, such as a tablet or a notebook computer, etc., the user's homepage website, the album that the target music belongs to, etc., may be displayed.

S102: displaying first pushing information.

In the present step, the displaying the first pushing information includes:

displaying a first pushing control, where the first pushing control is used for accommodating the first pushing information.

Specifically, the first pushing control is displayed on a display screen or a displaying interface of the user terminal, and a content displayed by the first pushing control may include user information that has an association relationship with the target music and is screened out by the server, for example, the user profile picture and/or the user name of the user information may be displayed.

Figure 2B:
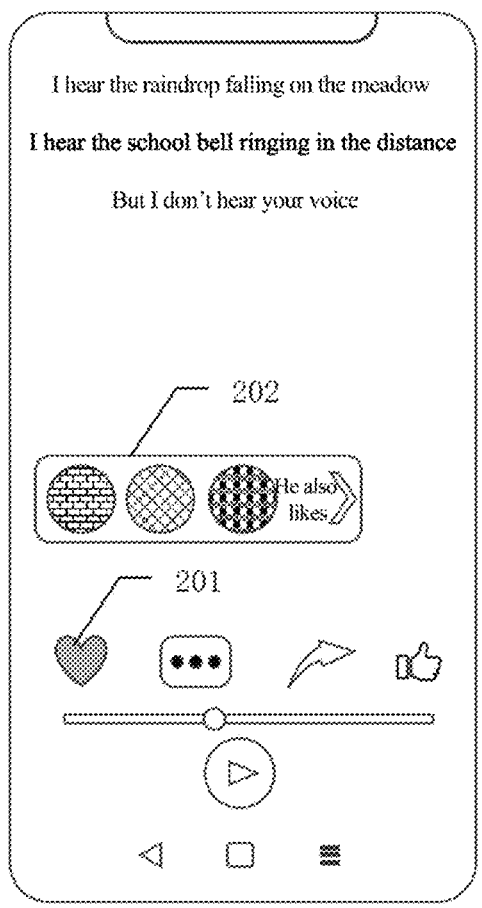

In order to facilitate understanding, the following descriptions are made in conjunction with the drawings. Referring to FIGS. 2b-2e, as shown in FIG. 2b, after the user clicks on the collecting control 201, the collecting control 201 turns into a solid red heart, then the first pushing control 202 is displayed in the operation interface, the first pushing control 202 contains profile pictures of other three users who have collected the music being played in the current interface, and the profile pictures of the three users are arranged horizontally.

Figure 2C:
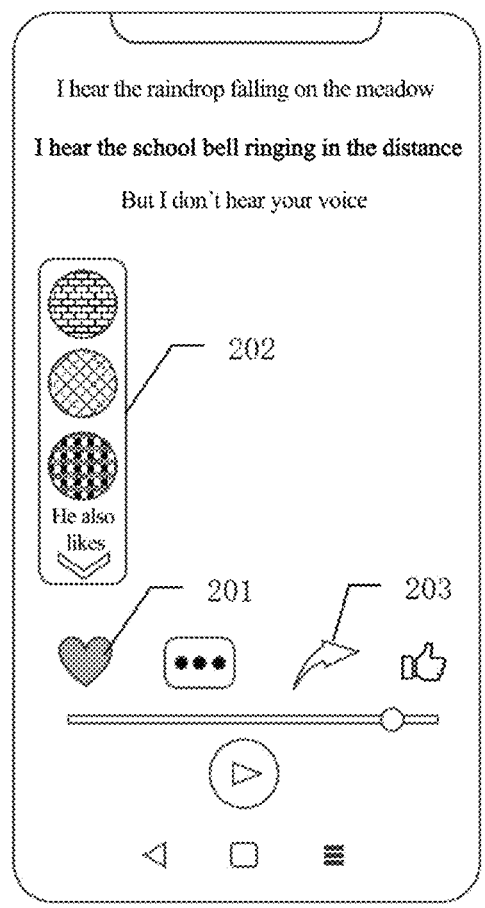

In a possible design, as shown in FIG. 2c, the user profile pictures in the first pushing control 202 may also be arranged vertically, and are in a position corresponding to the same column as the collecting control 201. It is understood that in this design, if the user clicks on other operation controls, such as the sharing control 203, the corresponding first pushing control 202 is displayed on a position corresponding to the same column as the sharing control 203. In this way, a position of the first pushing control 202 may be accordingly changed according to the different operation instructions being sent, to indicate different pushing contents.

Figure 2D:
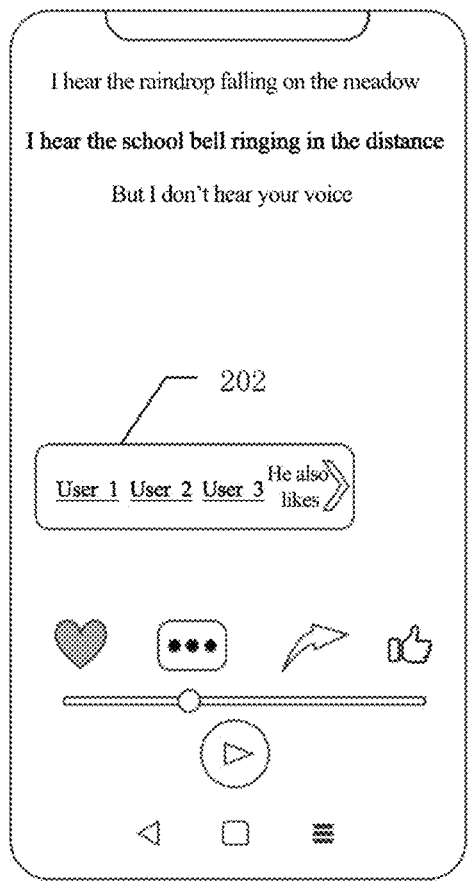
Figure 2E:
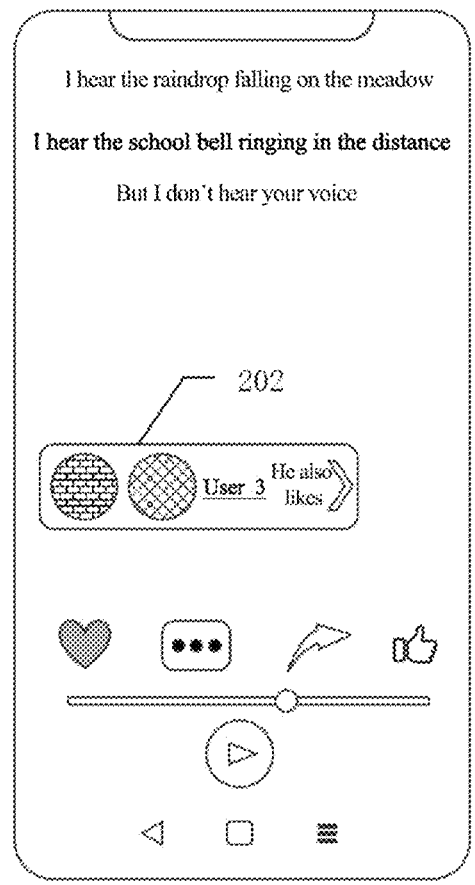
Figure 2F:
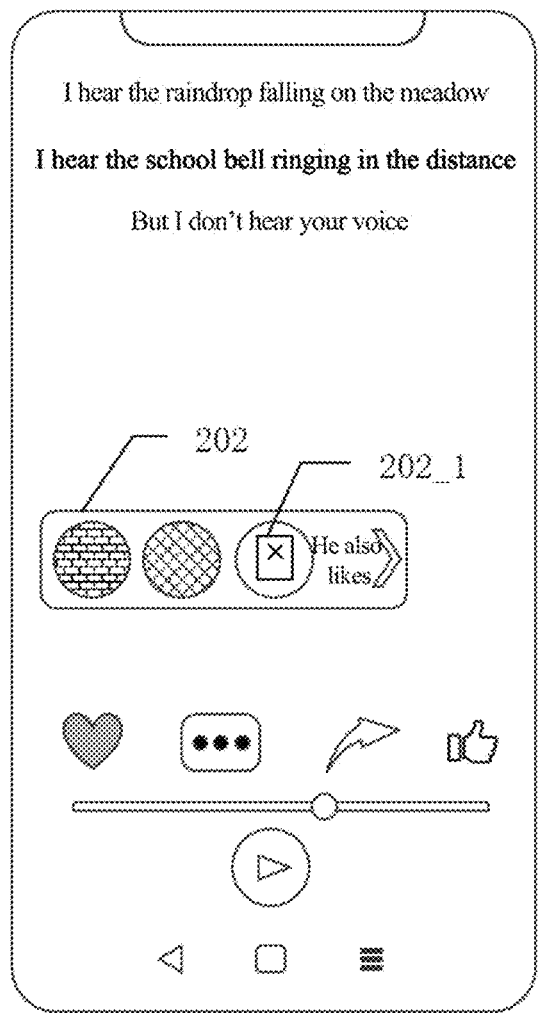

In a possible design, as shown in FIG. 2d, the user information displayed in the first pushing control 202 may be a user name, or as shown in FIG. 2e, when the user being screened out does not have a user profile picture, a user name is displayed, and if there is a user profile picture, the user profile picture will be displayed. Another possible circumstance is that, as shown in FIG. 2f, when the user being screened out does not have a profile picture, instead of a user profile picture, a default profile picture configured by a system is used for displaying, for example, a user profile picture 202_1 is the default profile picture configured by the system.

Next, a current user needs merely to click on a corresponding user profile picture or user name, then it skips to a corresponding user's homepage, or a corresponding user's red heart playlist list is displayed. And then, the current user may select corresponding music in homepages or red heart playlist lists of other users, and place an order for the selected music, or follow a corresponding user, or collect the entire playlist, etc., in this way, music pushing manners and channels are expanded, thereby guiding the user to provide, step by step, corresponding clues for the system to expand the music pushing.

Music pushing method, apparatus, electronic device, and storage medium are provided by the present embodiments, for the method, firstly, a user end displays user information that satisfies a preset association relationship with music currently on a music playing interface in response to an operation acting on the music playing interface. In the present embodiments, upon inputting an operation instruction on target music by a user, information of other users who have taken an associated operation instruction to the target music and have an unrestricted friend relationship with the user is displayed, and by presenting music lists corresponding to other users, the user is guided to acquire music pushing information, and thus, ways for the user to acquire the music pushing information are expanded, and problems that music pushing is single and centralized as well as the pushing depends on a friend relationship are overcome.

Figure 3:
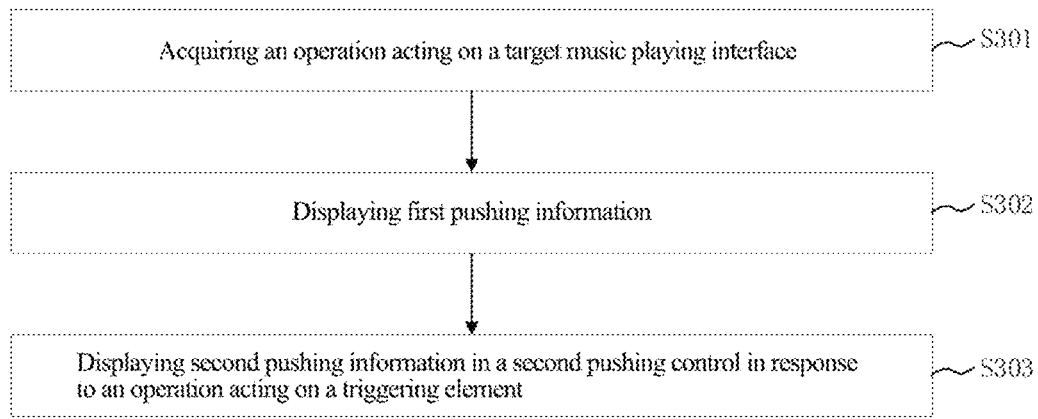
FIG. 3 is a second schematic flow diagram of a music pushing method provided by an embodiment of the present disclosure.

Referring to FIG. 3, FIG. 3 is a second schematic flow diagram of a music pushing method provided by an embodiment of the present disclosure. The method of the present embodiment is applied to a terminal device and/or a server of a user end, and the music pushing method includes:

S301: acquiring an operation acting on a target music playing interface.

In the present embodiment, target music is target music currently being played on an operation interface.

Then, screening out all user information that satisfies a preset association relationship from a user database according to music information.

In the present embodiment, the preset association relationship is that the target music is added to at least one playlist of a red heart playlist, a collection playlist, a self-built playlist, etc.

For example, all corresponding associated users who have added the target music to at least one playlist of a red heart playlist, a collection playlist, a self-built playlist, etc., are screened out from the user database.

Then, user information of all associated users is taken as first pushing information. The user information includes a user profile picture, a user name, etc.

Next, information of an active user who has been active within a preset active time is screened out from respective pieces of the user information.

For example, after all associated users who have the target music in the above playlists are screened out, whether the associated users have been active within 7 days is checked, the so-called active includes that a software account has been logged on, a collection operation has been performed, other users has been followed, an order for a song has been placed, etc. An active user is screened out, and the user end takes information of the active user as the first pushing information.

And then, custom profile picture user information that includes the user profile picture is screened out from respective pieces of the information of the active user.

For example, after an active user is screened out, whether the active user has set a custom profile picture is further checked, since a user profile picture may attract more attention of people, a user who has not set a user profile picture is excluded, that is, a user with a custom profile picture is selected, and the user end takes the custom profile picture user information as the first pushing information.

It should be noted that in a possible design, the first pushing information includes only a user profile picture.

S302: displaying the first pushing information.

In the present step, specifically, a first pushing control is displayed, and the first pushing control is used for accommodating the first pushing information.

In a possible design, the user information such as the user profile pictures of the first pushing information is arranged horizontally or vertically in the first pushing control. In an implementation, only a preset display number of user profile pictures are displayed in the first pushing control, for example, only 3 user profile pictures are displayed.

It should be noted that when the number of users of the first pushing information received by the user end is greater than or equal to a preset display number, a user profile picture to be displayed can be randomly selected, or users of the first pushing information can be sorted in terms of priority level of a preset attribute. For example, users of the first pushing information are sorted in terms of a total number of songs in a playlist, and information of users whose ranking is less than or equal to a preset display number is selected for displaying. It is also possible to classify according to a friend and a stranger, and user information of a friend or a stranger is preferentially displayed. It is also possible to sort according to the number of followers, and a top preset display number of users with the largest number of followers are displayed, for example, profile pictures of the top three users with the largest followers are displayed.

Figure 4A:
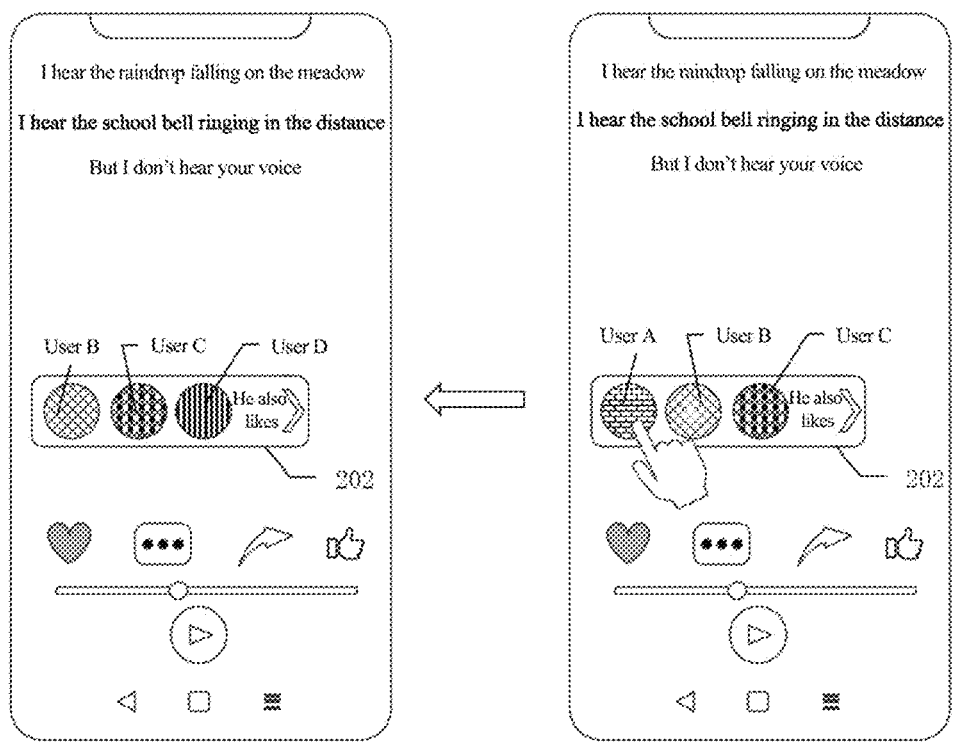
FIGS. 4a-4b are display effect diagrams of a first pushing control provided by embodiments of the present disclosure.
Figure 4B:
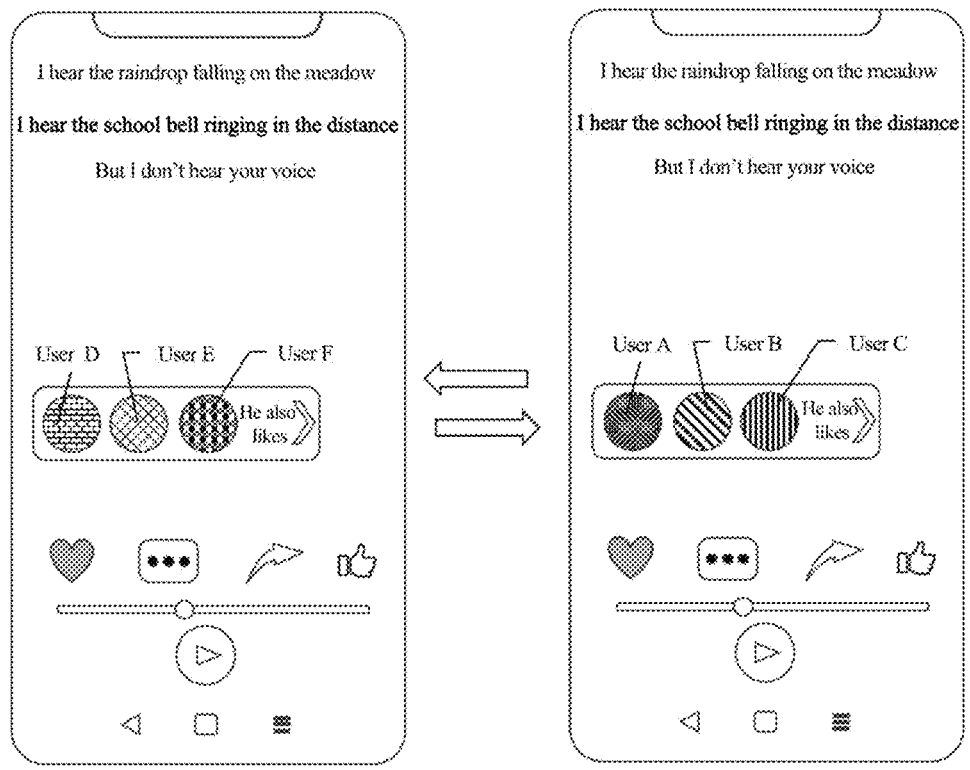

Referring to FIGS. 4a-4b, FIGS. 4a-4b are display effect diagrams of a first pushing control provided by embodiments of the present disclosure. As shown in FIG. 4a, in a possible design, only three user profile pictures are displayed in the first pushing control 202, and the current user may left-right slide on the first pushing control 202 by a hand, to left-right switch the displayed user profile pictures. For example, when the current user does not slide, the displayed user profile pictures are: user A, user B, and user C, and after the user slides, the displayed user profile pictures are: user B, user C, and user D.

In a possible design, within a time period, the first pushing control 202 is used for accommodating a first user profile picture sequence, and the first pushing information includes the first user profile picture sequence; and within another time period, the first pushing control 202 is used for accommodating a second user profile picture sequence, and the first pushing information includes the second user profile picture sequence. Specifically, as shown in FIG. 4b, three user profile pictures are taken as a set of profile picture sequence, for example, in a first time period, for example, within a first 2 seconds, a first user profile picture sequence consisted of "user A, user B, and user C" is displayed; while in a next time period, for example, within a second 2 seconds, a second user profile picture sequence consisted of "user D, user E, user F" is displayed, or the second user sequence is "user B, user C, user D". After all user profile picture sequences have been displayed, they will be displayed again from the start, to form a dynamic looping animation effect.

In a possible design, the first pushing information is displayed within a preset time period. That is, the first pushing control is displayed only within the preset time period, and will automatically disappear after the preset time period is exceeded, so that contents in the original operation interface will not be blocked for a long time. In an implementation, the user may also realize the function of automatically disappearing of the first pushing control by setting an "auto disappear" function on.

S303: displaying second pushing information in a second pushing control in response to an operation acting on a triggering element.

In the present embodiment, the first pushing control is further used for accommodating a prompt identifier, where the prompt identifier is used for indicating an association relationship between music and user information. As shown in FIG. 2b, a text identifier "He also likes" in the first pushing control 202 is a prompt identifier, which is used for indicating that users corresponding to the user profile pictures displayed in the first pushing control have also added the music currently being played to the "red heart playlist".

In the present embodiment, the first pushing control is further used for accommodating a triggering element, the triggering element is used for presenting second pushing information when the triggering element is triggered, and the second pushing information includes the first pushing information. Specifically, as shown in FIG. 2b, a rightmost button which is in a shape of ">" in the first pushing control 202 is a triggering element. When a user clicks on the triggering element, the user end displays the second pushing control or switches to another presenting interface.

In a possible design, the first pushing information includes only user information of a part of users who satisfy the preset association relationship, and then, the second pushing information is used for presenting user information of all users who satisfy the preset association relationship in the second pushing control of the user end.

Then, according to music information of the music currently on the music playing interface, user information that satisfies the preset association relationship is screened out from a user database.

In the present step, a preset screening model or a preset retrieve algorithm is utilized to traverse the user database, to screen out all users who satisfy the preset association relationship, for example, all users who have added the target music to any playlist corresponding to the users.

It should be noted that in a possible design, firstly, associated users who satisfy a preset number are screened out, the user end immediately takes these associated users as the first pushing information, and then screening is continuously performed in the user database, and screening results are stored in a memory. After the user performs a corresponding operation on a triggering element such as clicks on the triggering element, the user end may take all user information that satisfies the preset association relationship as the second pushing information for displaying. In this way, a display delay of the second pushing control after the user clicks on the triggering element can be reduced, and the user experience is improved.

In the present step, the user end renders the second pushing information into the second pushing control. In an implementation, the second pushing control is not in a same displaying interface as the current interface. That is, after the user clicks on the triggering element, the user interface switches to another interface used for presenting the associated user information.

Figure 5:
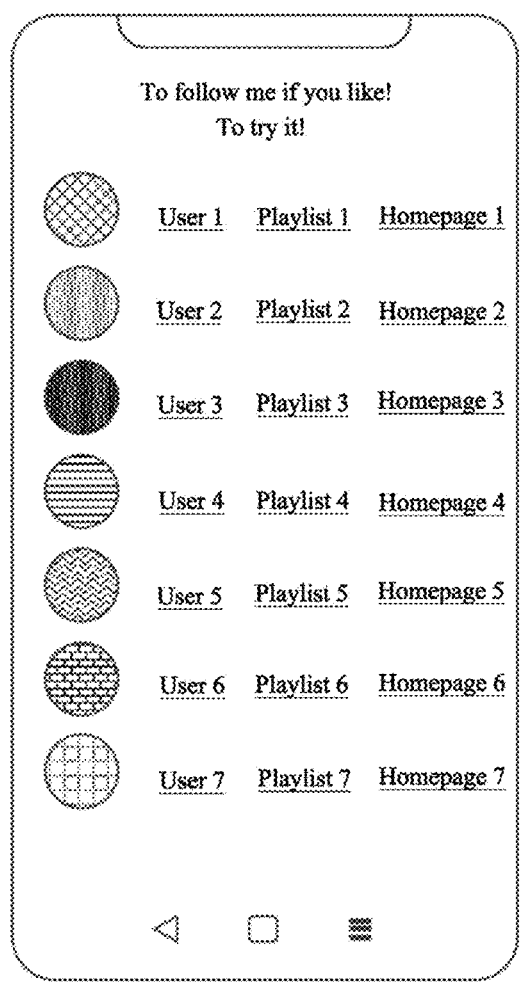
FIG. 5 is a schematic diagram of a second pushing control provided by an embodiment of the disclosure.

Referring to FIG. 5, FIG. 5 is a schematic diagram of a second pushing control provided by an embodiment of the present disclosure. All user information can be displayed in the second pushing control, and the user information may be arranged according to a preset rule, for example being ranked comprehensively according to one or more indexes such as the total number of songs in a playlist, the number of followers, the number of subscriptions, etc. As shown in FIG. 5, the second pushing control includes a user profile picture, a user name, a user playlist link, and a user homepage link. It should be understood that those skilled in the art may select a content to be displayed in the second pushing control according to actual needs, and it is not limited to the content of the present embodiment.

Then, the user may click on a relevant content in the second pushing control, to perform operations such as collecting a song, placing an order for music, following an associated user, etc., in this way, a decentralized music information pushing manner that enables music information pushing under non-friend relationship is realized.

Music pushing method, apparatus, electronic device, and storage medium are provided by the present embodiments, for the method, firstly, a user end displays user information that satisfies a preset association relationship with music currently on a music playing interface in response to an operation acting on the music playing interface. In the present embodiments, upon inputting an operation instruction on target music by a user, information of other users who have taken an associated operation instruction to the target music and have an unrestricted friend relationship with the user is displayed, and by presenting music lists corresponding to other users, the user is guided to acquire music pushing information, and thus, ways for the user to acquire the music pushing information are expanded, and problems that music pushing is single and centralized as well as the pushing depends on a friend relationship are overcome.

Figure 6:
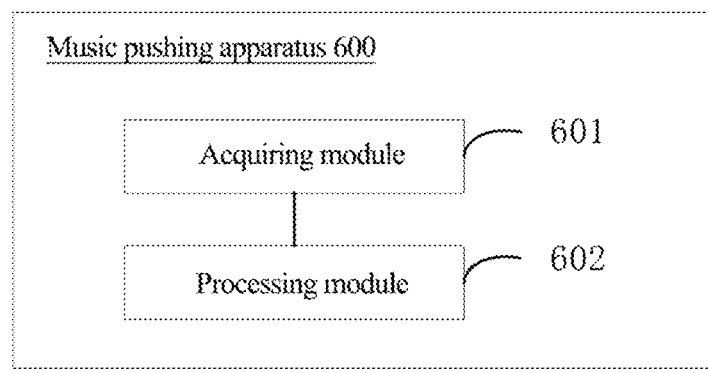
FIG. 6 is a structural block diagram of a music pushing apparatus provided by an embodiment of the disclosure.

Corresponding to the music pushing method of the above embodiments, FIG. 6 is a structural block diagram of a music pushing apparatus of a user end provided by an embodiment of the present disclosure. For ease of description, only parts related to the embodiment of the present disclosure are shown. Referring to FIG. 6, the apparatus includes:

an acquiring module 601, configured to acquire an operation on a music playing interface;

a processing module 602, configured to display first pushing information in response to the operation, where the first pushing information includes user information, and the user information satisfies a preset association relationship with music currently on the music playing interface.

In an embodiment of the present disclosure, the user information includes at least one of friend user information and stranger user information.

In an embodiment of the present disclosure, the processing module 602 is configured to display the first pushing information, including:

the processing module is configured to display a first pushing control, where the first pushing control is used for accommodating the first pushing information.

In an embodiment of the present disclosure, the first pushing control is used for accommodating a user profile picture in the first pushing information.

In an embodiment of the present disclosure, the processing module 602 is further configured to, within a time period, use the first pushing control for accommodating a first user profile picture sequence, and the first pushing information includes the first user profile picture sequence; and within another time period, use the first pushing control for accommodating a second user profile picture sequence, and the first pushing information includes the second user profile picture sequence.

In an embodiment of the present disclosure, the processing module 602 is further configured to sort the first user profile picture sequence and/or the second user profile picture sequence according to priority level of a preset attribute of respective users in the sequence.

In an embodiment of the present disclosure, the preset attribute includes the number of music corresponding to respective users in the user information.

In an embodiment of the present disclosure, the processing module 602 is further configured to use the first pushing control for accommodating a prompt identifier, where the prompt identifier is used for indicating an association relationship between the music and the user information.

In an embodiment of the present disclosure, the processing module 602 is further configured to use the first pushing control for accommodating a triggering element, use the triggering element for presenting second pushing information when the triggering element is triggered, where the second pushing information includes the first pushing information.

In an embodiment of the present disclosure, the processing module 602 is further configured to use the triggering element for presenting the second pushing information when the triggering element is triggered, including:

the acquiring module 601 is further configured to acquire an operation on the triggering element;

the processing module 602 is further configured to display the second pushing information in a second pushing control in response to the operation acting on the triggering element; where the second pushing information includes all user information that satisfies the preset association relationship with the music currently on the music playing interface.

In an embodiment of the present disclosure, the processing module 602 is configured to display the first pushing information, including:

the processing module 602 is configured to display the first pushing information within a preset time period.

In an embodiment of the present disclosure, the user information satisfies a preset screening condition.

In an embodiment of the present disclosure, the preset screening condition includes:

screening out all user information that satisfies the preset association relationship from the user database;

the first pushing information includes respective pieces of the user information.

In an embodiment of the present disclosure, the first pushing information includes a user profile picture.

In an embodiment of the present disclosure, the preset screening condition includes:

screening out information of an active user who has been active within a preset active time from respective pieces of the user information;

accordingly, the first pushing information includes at least one piece of the information of the active user.

In an embodiment of the present disclosure, the preset screening condition further includes:

screening out custom profile picture user information that includes user profile picture from respective pieces of the information of the active user;

accordingly, the first pushing information includes at least one piece of the custom profile picture user information.

The apparatus 600 provided by the present embodiment may be used to perform user end related steps in the technical solutions of the above method embodiments, implementation principles and technical effects thereof are similar, and will not be repeated in the present embodiment herein.

Figure 7:
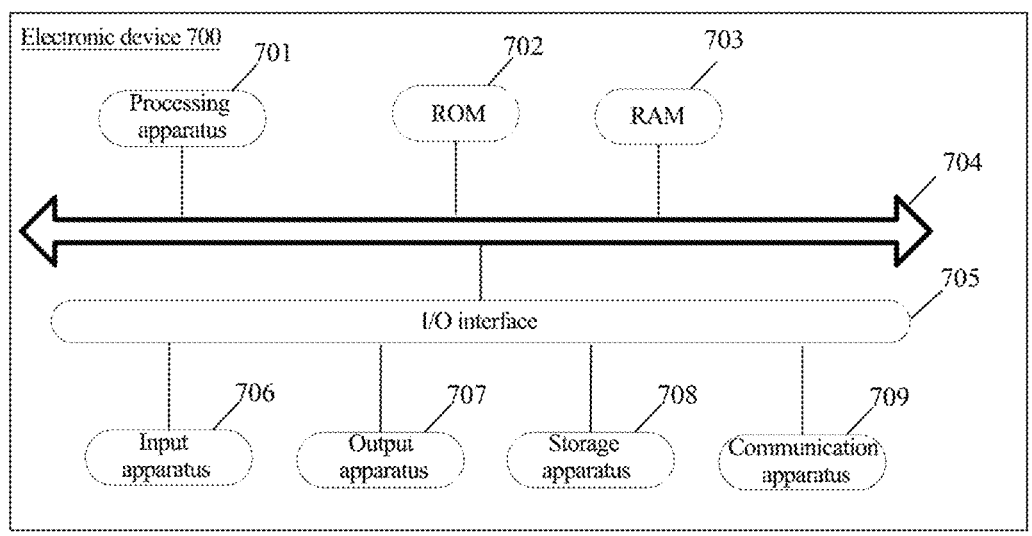
FIG. 7 is a hardware structural schematic diagram of an electronic device provided by an embodiment of the disclosure.

Referring to FIG. 7, it shows a structural schematic diagram of an electronic device 700 suitable for implementing embodiments of the present disclosure, and the electronic device 700 may be a terminal device or a server. The terminal device may include, but is not limited to, a mobile terminal, such as a mobile phone, a notebook computer, a digital broadcast receiver, a personal digital assistant (PDA for short), a portable android device (PAD for short), a portable media player (PMP for short), an in-vehicle terminal (for example, an in-vehicle navigation terminal), etc., as well as a fixed terminal, such as a digital television (TV), a desktop computer, etc. The electronic device shown in FIG. 7 is merely an example, and should not bring about any limitation to functions and usage scopes of embodiments of the present disclosure.

As shown in FIG. 7, the electronic device 700 may include a processing apparatus (for example, a central processor, a graphic processor, etc.) 701, which may perform various appropriate actions and processing according to a program stored in a read only memory (Read ROM) 702 or a program loaded from a storage apparatus 708 to a random access memory (RAM) 703. In the RAM 703, various programs and data required for operations of the electronic device 700 may also be stored. The processing apparatus 701, the ROM 702, and the RAM 703 are connected to each other by a bus 704. An input/output (I/O) interface 705 is also connected to the bus 704.

Generally, the following apparatuses may connect to the I/O interface 705: an input apparatus 706, which includes, for example, a touch screen, a touch pad, a keyboard, a mouse, a camera, a microphone, an accelerometer, a gyroscope, etc.; an output apparatus 707, which includes, for example, a liquid crystal display (LCD for short), a speaker, a vibrator, etc.; a storage apparatus 708, which includes, for example, a magnetic tape, a hard disk, etc.; and a communication apparatus 709. The communication apparatus 709 may allow the electronic device 700 to communicate with other devices in a wireless or wired way, to exchange data. Although FIG. 7 shows an electronic device 700 having various apparatuses, it should be understood that it is not required to implement or have all of the shown apparatuses. It is alternatively possible to implement or have more or fewer apparatuses.

In particular, according to an embodiment of the present disclosure, processes described above with reference to flowchart may be implemented as a computer software program. For example, an embodiment of the present disclosure includes a computer program product, which includes a computer program carried on a computer readable medium, and the computer program contains program codes used for executing the method shown in the flowchart. In such embodiment, the computer program may be downloaded and installed from a network via the communication apparatus 709, or installed from the storage apparatus 708, or installed from the ROM 702. When the computer program is executed by the processing apparatus 701, the above functions defined in the method of the embodiment of the present disclosure are performed. An embodiment of the present disclosure further includes a computer program that, when executed by a processor, implements the above functions defined in the method of the embodiment of the present disclosure.

It should be noted that the above computer readable medium in the present disclosure may be a computer readable signal medium, or a computer readable storage medium, or any combination of both. The computer readable storage medium may be, for example, but is not limited to, an electrical, magnetic, optical, electromagnetic, infrared, or semiconductor system, apparatus, or device, or any combination thereof. More specific examples of the computer readable storage medium may include, but is not limited to: an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof. In the present disclosure, a computer readable storage medium may be any tangible medium that contains or stores a program, and the program may be used by or in combination with an instruction execution system, apparatus, or device. In the present disclosure, a computer readable signal medium may include a data signal propagated in a baseband or as a part of a carrier, and the data signal carries computer readable program codes. Such propagated data signal may take various forms, including but are not limited to an electromagnetic signal, an optical signals, or any suitable combination thereof. The computer readable signal medium may also be any computer readable medium other than the computer readable storage medium, and the computer readable signal medium may send, propagate, or transmit a program which is used by or in combination with the instruction execution system, apparatus, or device. The program codes contained in the computer readable medium may be transmitted by any suitable medium, including but is not limited to: a wire, an optical cable, a radio frequency (RF), etc., or any suitable combination thereof.

The above computer readable medium may be included in the above electronic device; or may exist alone without being assembled into the electronic device.

The above computer readable medium carries one or more programs that, when executed by the electronic device, cause the electronic device to perform the method shown in the above embodiment.

The computer program codes used to perform operations of the present disclosure may be written in one or more programming languages or a combination thereof, the above programming languages include object-oriented programming languages, such as Java, Smalltalk, C++, and also include conventional procedural programming languages, such as "C" language or similar programming language. The program codes may be executed entirely on a user's computer, executed partly on the user's computer, executed as an independent software package, executed partly on the user's computer and partly on a remote computer, or executed entirely on the remote computer or a server. In the case of a remote computer involved, the remote computer may connect to the user's computer through any kind of networks, which includes a local area network (LAN) or a wide area network (WAN), or, the remote computer may connect to an external computer (for example, connect to the external computer via the Internet by utilizing an internet service provider).

Flowcharts and block diagrams in the drawings illustrate architectures, functions, and operations of possible implementations of systems, methods and computer program products according to various embodiments of the present disclosure. In this regard, each block in the flowcharts or block diagrams may represent a module, a program segment, or a part of codes, and the module, the program segment, or the part of codes contains one or more executable instructions used for realizing specified logic functions. It should also be noted that in some alternative implementations, functions marked in the block may also occur in an order different from the order marked in the drawings. For example, two blocks shown in succession may actually be performed substantially in parallel, and they may sometimes be performed in a reverse order, depending on the functions involved. It should also be noted that each block in the block diagrams and/or the flowcharts as well as combinations of blocks in the block diagrams and/or the flowcharts may be implemented by a dedicated hardware-based system that performs specified functions or operations, or may be implemented by a combination of dedicated hardware and computer instructions.

Units involved in embodiments described in the present disclosure may be implemented in software or hardware. Where a name of a unit does not constitute a limitation on the unit itself under certain circumstances, for example, a first acquiring unit may also be described as "a unit for acquiring at least two internet protocol addresses".

The functions herein described above may be performed at least in part by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store a program to be used by or in combination with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination thereof. More specific examples of the machine readable storage medium would include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

In a first aspect, according to one or more embodiments of the present disclosure, a music pushing method is provided, including:

displaying first pushing information in response to an operation on a music playing interface;

where the first pushing information includes user information, and the user information satisfies a preset association relationship with music currently on the music playing interface.

According to one or more embodiments of the present disclosure, the user information includes at least one of friend user information and stranger user information.

According to one or more embodiments of the present disclosure, the displaying the first pushing information includes:

displaying a first pushing control, where the first pushing control is used for accommodating the first pushing information.

According to one or more embodiments of the present disclosure, the first pushing control is used for accommodating a user profile picture in the first pushing information.

According to one or more embodiments of the present disclosure, within a time period, the first pushing control is used for accommodating a first user profile picture sequence, and the first pushing information includes the first user profile picture sequence; within another time period, the first pushing control is used for accommodating a second user profile picture sequence, and the first pushing information includes the second user profile picture sequence.

According to one or more embodiments of the present disclosure, the first user profile picture sequence and/or the second user profile picture sequence is/are sorted according to priority level of a preset attribute of respective users in the sequence.

According to one or more embodiments of the present disclosure, the preset attribute includes the number of music corresponding to respective users in the user information.

According to one or more embodiments of the present disclosure, the first pushing control is further used for accommodating a prompt identifier, where the prompt identifier is used for indicating an association relationship between the music and the user information.

According to one or more embodiments of the present disclosure, the first pushing control is further used for accommodating a triggering element, the triggering element is used for presenting second pushing information when the triggering element is triggered, and the second pushing information includes the first pushing information.

According to one or more embodiments of the present disclosure, the triggering element is used for presenting second pushing information when the triggering element is triggered, includes:

displaying the second pushing information in a second pushing control in response to an operation acting on the triggering element;

where the second pushing information includes all user information that satisfies a preset association relationship with the music currently on the music playing interface.

According to one or more embodiments of the present disclosure, the displaying the first pushing information includes:

displaying the first pushing information within a preset time period.

According to one or more embodiments of the present disclosure, the target music includes at least one of audio, video, picture, and text.

According to one or more embodiments of the present disclosure, the user information satisfies a preset screening condition.

According to one or more embodiments of the present disclosure, the preset screening condition includes:
screening out all user information that satisfies the preset association relationship from the user database;
where the first pushing information includes respective pieces of the user information.

According to one or more embodiments of the present disclosure, the first pushing information includes a user profile picture.

According to one or more embodiments of the present disclosure, the preset screening condition includes:
screening out information of an active user who has been active within a preset active time from respective pieces of the user information;
accordingly, the first pushing information includes at least one piece of the information of the active user.

According to one or more embodiments of the present disclosure, the preset screening condition further includes:
screening out custom profile picture user information that includes the user profile picture from respective pieces of the information of the active user;
accordingly, the first pushing information includes at least one piece of the custom profile picture user information.

In a second aspect, according to one or more embodiments of the present disclosure, a music pushing apparatus is provided, including:
an acquiring module, configured to acquire an operation on a music playing interface;
a processing module, configured to display first pushing information in response to the operation, where the first pushing information includes user information, and the user information satisfies a preset association relationship with music currently on the music playing interface.

According to one or more embodiments of the present disclosure, the user information includes at least one of friend user information and stranger user information.

According to one or more embodiments of the present disclosure, the processing module is configured to display the first pushing information, including:
the processing module is configured to display a first pushing control, where the first pushing control is used for accommodating the first pushing information.

According to one or more embodiments of the present disclosure, the first pushing control is used for accommodating a user profile picture in the first pushing information.

According to one or more embodiments of the present disclosure, the processing module is further configured to, within a time period, use the first pushing control for accommodating a first user profile picture sequence, and the first pushing information includes the first user profile picture sequence; within another period, use the first pushing control for accommodating a second user profile picture sequence, and the first pushing information includes the second user profile picture sequence.

According to one or more embodiments of the present disclosure, the processing module is further configured to sort the first user profile picture sequence and/or the second user profile picture sequence according to priority level of a preset attribute of respective users in the sequence.

According to one or more embodiments of the present disclosure, the preset attribute includes the number of music corresponding to respective users in the user information.

According to one or more embodiments of the present disclosure, the processing module is further configured to use the first pushing control for accommodating a prompt identifier, where the prompt identifier is used for indicating an association relationship between the music and the user information.

According to one or more embodiments of the present disclosure, the processing module is further configured to use the first pushing control for accommodating a triggering element, use the triggering element for presenting second pushing information when the triggering element is triggered, where the second pushing information includes the first pushing information.

According to one or more embodiments of the present disclosure, the processing module is further configured to use the triggering element for presenting the second pushing information when the triggering element is triggered, including:
the acquiring module is further configured to acquire an operation on the triggering element;
the processing module is further configured to display second pushing information in a second pushing control in response to the operation acting on the triggering element; where the second pushing information includes all user information that satisfies the preset association relationship with the music currently on the music playing interface.

According to one or more embodiments of the present disclosure, the processing module is configured to display the first pushing information, including:
the processing module is configured to display the first pushing information within a preset time period.

According to one or more embodiments of the present disclosure, the user information satisfies a preset screening condition.

According to one or more embodiments of the present disclosure, the preset screening condition includes:
screening out all user information that satisfies the preset association relationship from the user database;
where the first pushing information includes respective pieces of the user information.

According to one or more embodiments of the present disclosure, the first pushing information includes a user profile picture.

According to one or more embodiments of the present disclosure, the preset screening condition includes:
screening out information of an active user who has been active within a preset active time from respective pieces of the user information;
accordingly, the first pushing information includes at least one piece of the information of the active user.

According to one or more embodiments of the present disclosure, the preset screening condition further includes:

screening out custom profile picture user information that includes the user profile picture from respective pieces of the information of the active user;

accordingly, the first pushing information includes at least one piece of the custom profile picture user information.

In a third aspect, according to one or more embodiments of the present disclosure, an electronic device is provided, including:

at least one processor and a memory;

where the memory stores computer executable instructions;

the at least one processor executes the computer executable instructions stored in the memory, causing the at least one processor to perform the music pushing method in the above first aspect and various possible designs of the first aspect.

In a fourth aspect, according to one or more embodiments of the present disclosure, a computer readable storage medium is provided, the computer readable storage medium stores computer executable instructions, when a processor executes the computer executable instructions, the music pushing method in the above first aspect and various possible designs of the first aspect is implemented.

In a fifth aspect, according to one or more embodiments of the present disclosure, a computer program product is provided, the computer program product includes: a computer program, when a processor executes the computer program, the music pushing method in the above first aspect and various possible designs of the first aspect is implemented.

In a sixth aspect, according to one or more embodiments of the present disclosure, a computer program is provided, when a processor executes the computer program, the music pushing method in the above first aspect and various possible designs of the first aspect is implemented.

The above description is merely preferred embodiments of the present disclosure and an illustration of applied technical principles. Those skilled in the art should understand that the disclosed scope involved in the present disclosure is not limited to technical solutions formed by a specific combination of the above technical features, and should also cover other technical solutions formed by any combination of the above technical features or equivalent features thereof without departing from the above disclosed concept, for example, a technical solution formed by replacing the above features with technical features having similar functions as the above features and being disclosed in the present disclosure (without limitation).

In addition, although operations are depicted in a specific order, this should not be understood as requiring these operations to be performed in the specific order as shown or in a sequential order. Under certain circumstances, multi-tasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features described in the context of a single embodiment may also be implemented in multiple embodiments individually or in any suitable subcombination.

Although the present subject matter has been described in language specific to structural features and/or methodological logical actions, it should be understood that the subject matter defined in the appended claims is not necessarily limited to the specific features or actions described above. Conversely, the specific features and actions described above are merely exemplary forms for implementing the claims.

What is claimed is:

1. A music pushing method, comprising:
   displaying first pushing information in response to an operation on a music playing interface, wherein the operation is an operation of clicking on a collection button;
   wherein the first pushing information comprises user information, the user information satisfies a preset association relationship with music currently on the music playing interface, and the user information comprises stranger user information;
   wherein the displaying the first pushing information comprises:
   displaying a first pushing control, wherein the first pushing control is used for accommodating the first pushing information, wherein the first pushing information comprises a user profile picture;
   wherein within a time period, the first pushing control is used for accommodating a first user profile picture sequence, and the first pushing information comprises the first user profile picture sequence; and within another time period, the first pushing control is used for accommodating a second user profile picture sequence, and the first pushing information comprises the second user profile picture sequence; and
   wherein the first pushing control is displayed only within a preset time period, and then automatically disappears after the preset time period is exceeded.

2. The music pushing method according to claim 1, wherein the user information comprises friend user information.

3. The music pushing method according to claim 1, wherein the first pushing control is used for accommodating the user profile picture in the first pushing information.

4. The music pushing method according to claim 1, wherein the first user profile picture sequence and/or the second user profile picture sequence is/are sorted according to priority level of a preset attribute of respective users in the sequence.

5. The music pushing method according to claim 4, wherein the preset attribute comprises the number of music corresponding to respective users in the user information.

6. The music pushing method according to claim 1, wherein the first pushing control is further used for accommodating a prompt identifier, and wherein the prompt identifier is used for indicating an association relationship between the music and the user information.

7. The music pushing method according to claim 1, wherein the first pushing control is further used for accommodating a triggering element, the triggering element is used for presenting second pushing information when the triggering element is triggered, and the second pushing information comprises the first pushing information.

8. The music pushing method according to claim 7, wherein the triggering element is used for presenting the second pushing information when the triggering element is triggered comprising:
   displaying the second pushing information in a second pushing control in response to an operation acting on the triggering element;

wherein the second pushing information comprises all user information that satisfies the preset association relationship with the music currently on the music playing interface.

9. The music pushing method according to claim 1, wherein the displaying the first pushing information comprises:
displaying the first pushing information within the preset time period.

10. The music pushing method according to claim 1, wherein the user information satisfies a preset screening condition.

11. The music pushing method according to claim 10, wherein the preset screening condition comprises:
screening out all user information that satisfies the preset association relationship from a user database;
wherein the first pushing information comprises respective pieces of the user information.

12. The music pushing method according to claim 10, wherein the preset screening condition comprises:
screening out information of an active user who has been active within a preset active time from respective pieces of the user information; and
accordingly, the first pushing information comprises at least one piece of the information of the active user.

13. The music pushing method according to claim 12, wherein the preset screening condition further comprises:
screening out custom profile picture user information that comprises the user profile picture from respective pieces of the information of the active user;
accordingly, the first pushing information comprises at least one piece of the custom profile picture user information.

14. A music pushing apparatus, comprising: at least one processor and a memory; wherein the memory stores instructions executable by the at least one processor; and the at least one processor, when executing the instructions, is configured to:
acquire an operation on a music playing interface, wherein the operation is an operation of clicking on a collection button; and
display first pushing information in response to the operation, wherein the first pushing information comprises user information, the user information satisfies a preset association relationship with music currently on the music playing interface, and the user information comprises stranger user information;
wherein the at least one processor is further configured to:
display a first pushing control, wherein the first pushing control is used for accommodating the first pushing information, wherein the first pushing information comprises a user profile picture;
wherein within a time period, the first pushing control is used for accommodating a first user profile picture sequence, and the first pushing information comprises the first user profile picture sequence; and within another time period, the first pushing control is used for accommodating a second user profile picture sequence, and the first pushing information comprises the second user profile picture sequence; and
wherein the first pushing control is displayed only within a preset time period, and then automatically disappears after the preset time period is exceeded.

15. The music pushing apparatus according to claim 14, wherein the user information comprises friend user information.

16. A non-transitory computer readable storage medium, wherein the computer readable storage medium stores computer executable instructions, when a processor executes the computer executable instructions, the following steps are implemented:
displaying first pushing information in response to an operation on a music playing interface, wherein the operation is an operation of clicking on a collection button;
wherein the first pushing information comprises user information, the user information satisfies a preset association relationship with music currently on the music playing interface, and the user information comprises stranger user information;
wherein the displaying the first pushing information comprises:
displaying a first pushing control, wherein the first pushing control is used for accommodating the first pushing information, wherein the first pushing information comprises a user profile picture;
wherein within a time period, the first pushing control is used for accommodating a first user profile picture sequence, and the first pushing information comprises the first user profile picture sequence; and within another time period, the first pushing control is used for accommodating a second user profile picture sequence, and the first pushing information comprises the second user profile picture sequence; and
wherein the first pushing control is displayed only within a preset time period, and then automatically disappears after the preset time period is exceeded.

* * * * *